US006912103B1

US 6,912,103 B1

(12) United States Patent
Peng et al.

(10) Patent No.: US 6,912,103 B1
(45) Date of Patent: Jun. 28, 2005

(54) METHOD OF OPERATING A DISK DRIVE WITH A SLIDER AT LOADING AND UNLOADING FLY HEIGHTS GREATER THAN AN OPERATIONAL FLY HEIGHT

(75) Inventors: Jih-Ping Peng, Cupertino, CA (US); Ciuter Chang, Fremont, CA (US); Ji-Feng Ying, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 289 days.

(21) Appl. No.: 10/209,763

(22) Filed: Jul. 31, 2002

(51) Int. Cl.[7] .............................................. G11B 21/02
(52) U.S. Cl. ........................................................ 360/75
(58) Field of Search ............................................ 360/75

(56) References Cited

U.S. PATENT DOCUMENTS 5,729,399 A    3/1998  Albrecht et al.
5,870,250 A    2/1999  Bolasna et al.
6,353,510 B2 *  3/2002  Drouin ........................ 360/75

* cited by examiner

*Primary Examiner*—David Hudspeth
*Assistant Examiner*—Mitchell Slavitt
(74) *Attorney, Agent, or Firm*—Won Tae C. Kim, Esq.; Stetina, Brunda, Garred & Brucker

(57) ABSTRACT

A method of operating a disk drive. The disk drive includes a disk having a disk surface, a slider disposable adjacent the disk surface, and a slider loading/unloading ramp for the slider. The method includes rotating the disk at a loading speed. The method further includes loading the slider from the loading/unloading ramp at a loading fly height above the disk surface. The method further includes rotating the disk at an operational speed greater than the loading speed. The method further includes operating the slider at an operational fly height above the disk surface less than the loading fly height above the disk surface. The method further includes rotating the disk at an unloading speed less than the operational speed. The method further includes unloading the slider from the disk to the loading/unloading ramp at an unloading fly height greater than the operational fly height.

13 Claims, 3 Drawing Sheets

METHOD OF OPERATING A DISK DRIVE WITH A SLIDER AT LOADING AND UNLOADING FLY HEIGHTS GREATER THAN AN OPERATIONAL FLY HEIGHT

CROSS-REFERENCE TO RELATED APPLICATION

Not applicable.

BACKGROUND OF THE INVENTION

1. Field of the Invention

The present invention relates generally to disk drives, and in particular to a method of operating a disk drive with a slider at loading and unloading fly heights greater than an operational fly height.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The head stack assembly has an actuator assembly including at least one air bearing slider, typically several, for reading and writing data from and to the disk. Each air bearing slider includes a magnetic transducer. An example of a slider is disclosed in U.S. Pat. No. 5,777,825 (incorporated herein by reference) that describes a slider where a center pad disposed at a trailing side contains a transducer. The printed circuit hoard assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly, at least one head gimbal assembly (HGA), and a flex circuit cable assembly that are attached to the actuator assembly. A conventional "rotary" or "swing-type" actuator assembly typically comprises an actuator body, a pivot bearing cartridge, a coil portion that extends from one side of the actuator body to interact with one or more permanent magnets to form a voice coil motor, and one or more actuator arms that extend from an opposite side of the actuator body. The actuator body includes a bore and the pivot bearing cartridge engaged within the bore for allowing the actuator body to rotate between limited positions. At least one head gimbal assembly is distally attached to each of the actuator arms. A head gimbal assembly includes an air bearing slider that is attached to a suspension with a gimbal. The suspension resiliently supports the slider above the tracks of the disk during operation of the disk drive facilitating the slider to "fly" above the disk. The head gimbal assemblies and the flex circuit cable assembly are attached to the actuator assembly. The actuator assembly is controllably rotated so as to move the sliders relative to the disks for reading and writing operations with respect to the tracks contained on the disks.

A typical slider design includes leading and trailing sides. A center pad that includes an air bearing surface is disposed adjacent the trailing edge. A transducer or head is embedded within the center pad. At least one additional air bearing surface disposed upon a pad is provided adjacent the leading side. In this regard, a single air bearing surface may be provided which extends the width of the slider. Alternatively, a pair of air bearing surfaces may be provided at opposite lateral sides of the slider adjacent the leading edge. In addition, a depressed region or cavity is centrally disposed between the center pad and the leading side air bearing surfaces. Furthermore, lateral pad or side rails may be disposed laterally with respect to the slider for providing aerodynamic stability, especially with respect to roll stability.

When the disk drive is not performing disk reading or writing operations, the head stack assembly is configured to pivot such that the sliders are positioned or parked at a loading/unloading ramp overlying a portion of non-data regions, such as at the ID or OD of the disks. An example of a slider is disclosed in U.S. Pat. No. 6,344,950 (incorporated herein by reference) that describes a ramp for performing slider loading and loading operations at the OD of a disk. The loading/unloading ramp supports the sliders so as to prevent undesirable contact between the sliders and the disks. When operating the disk drive, the head stack assembly is pivoted such that the sliders are moved toward the disk along the ramp with the disks rotating at an operational speed of the disk drive. The sliders become in contact with an air stream resulting from the rotating disks. The sliders are considered loaded upon being aerodynamically supported. The height at which the sliders are loaded is the loading fly height. The sliders have a defined operational fly height that is equal to the loading fly height.

When the disk drive has concluded performing disk reading or writing operations, the head stack assembly is again pivoted in a reverse direction so as to park the sliders at the loading/unloading ramp. When the disk drive in not reading or writing from and to the disk, the head stack assembly is configured to pivot the actuator assembly such that loading/unloading ramp supports the sliders. The height the sliders start to become supported by the loading/unloading ramp is the unloading fly height. This is usually the same as the loading fly height.

In order to increase the amount of data recorded upon a given disk, specifications for increasing areal density continue to increase. As a result, it is desirable to fly the slider at lower and lower heights above the tracks of the disks. However, lower fly heights increase the susceptibility of the slider coming into physical contact with the disk during operation. Such contact may result in damage to the slider, including the transducer therein, as well as the disk and the data associated with the tracks. During loading and unloading operations, the sliders may be subject to a variety of forces that may result in the sliders coming into contact with the disk. Accordingly, there is a need in the art for an improved method of operating a disk drive in comparison to the prior art.

SUMMARY OF THE INVENTION

An aspect of the present invention can be regarded as a method of operating a disk drive. The disk drive includes a disk having a disk surface, a slider disposable adjacent the disk surface for writing and reading data to and from the disk, and a slider loading/unloading ramp for the slider. The method includes rotating the disk at a loading speed. The method further includes loading the slider from the loading/unloading ramp at a loading fly height above the disk surface. The method further includes rotating the disk at an operational speed greater than the loading speed. The method further includes operating the slider at an operational fly height above the disk surface less than the loading fly height above the disk surface. The method further includes rotating the disk at an unloading speed less than the operational speed. The method further includes unloading the slider from the disk to the loading/unloading ramp at an unloading fly height greater than the operational fly height.

According to various embodiments, the loading speed may be between 10% to 90% of the operational speed. The unloading speed may be between 10% to 90% of the operational speed. The loading speed may be substantially equal to the unloading speed. The loading fly height may be between 5% to 50% of the operational fly height above the operational fly height. The unloading fly height may be between 5% to 50% of the operational fly height above the operational fly height. The loading fly height may be substantially equal to the unloading fly height.

DESCRIPTION OF THE PREFERRED EMBODIMENTS

Figure 1:
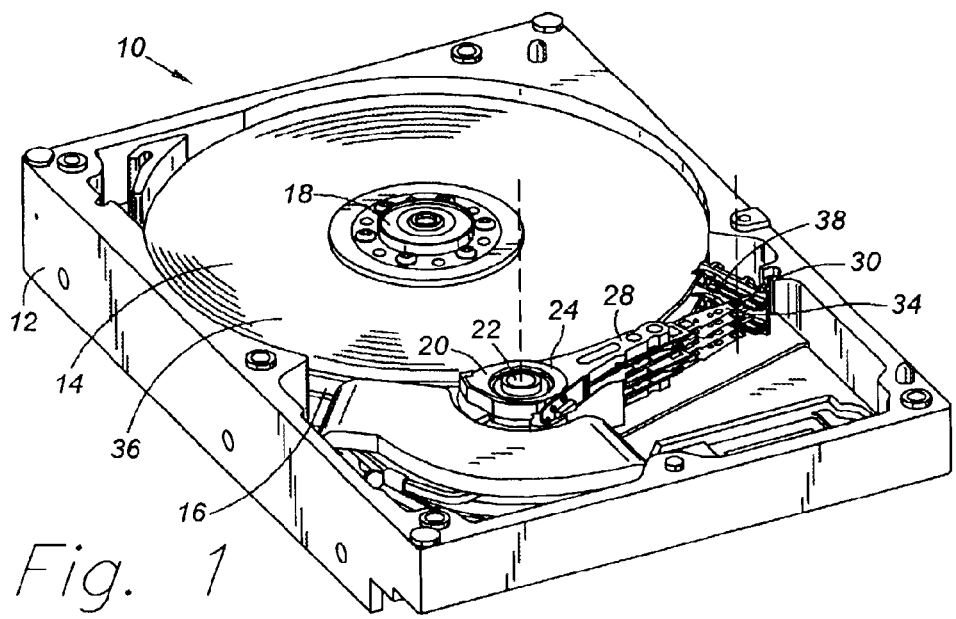
FIG. 1 is a perspective view of a disk drive (cover not shown) including a head stack assembly with sliders and a slider loading/unloading ramp as utilized in the method in accordance with the present invention.

Referring now to the drawings wherein the showings are for purposes of illustrating preferred embodiments of the present invention only, and not for purposes of limiting the same, FIGS. 1–6 illustrate a disk drive and a method operating the disk drive in accordance with the aspects of the present invention.

Referring now to FIG. 1 there is depicted a perspective view of a disk drive 10 utilized in accordance with an aspect of the present invention. In the embodiment shown, the disk drive 10 includes a head disk assembly (HDA) and a printed circuit board assembly (PCBA). The head disk assembly includes a housing that may include a disk drive base 12 and a cover (not shown) that collectively house magnetic disks 14, 16. Each magnetic disk 14, 16 contains a plurality of tracks for storing data. The magnetic disks 14, 16 may be two-sided. The head disk assembly further includes a spindle motor 18 for rotating the magnetic disks 14, 16. The head disk assembly further includes a head stack assembly 20 and a pivot bearing cartridge 22. The head stack assembly 20 includes a rotary actuator 24.

Figure 2:
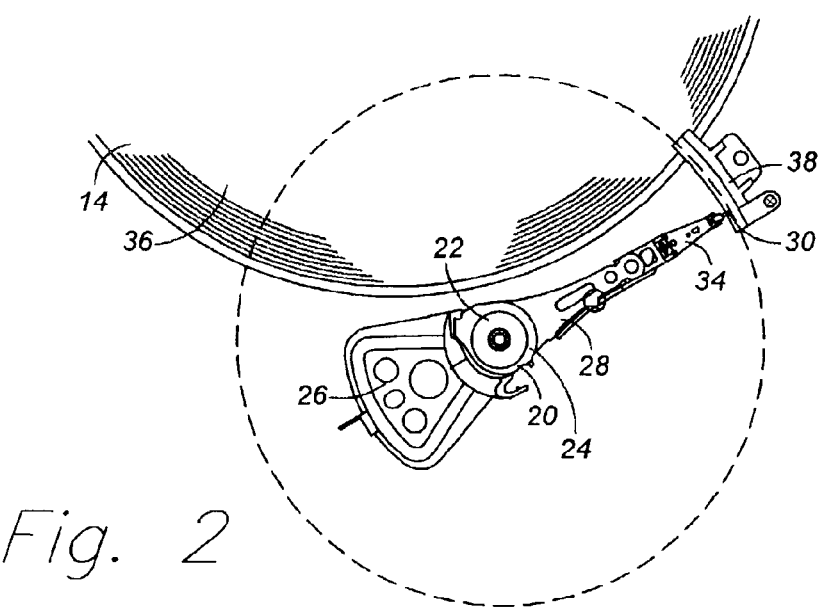
FIG. 2 is a top view the head stack assembly with sliders shown in a parked position in relation to the disks and the slider loading/unloading ramp of FIG. 1.

Referring additionally to FIG. 2 there is depicted a top view of the head stack assembly 20 with the slider 30 shown in a parked position in relation to the disk 14. The rotary actuator 24 includes a bore and the pivot bearing cartridge 22 is engaged within the bore for facilitating rotation between limited positions. The rotary actuator 24 further includes a coil portion 26 that extends from one side to interact with a pair of permanent magnets to form a voice coil motor for pivoting the rotary actuator 24. A plurality of actuator arms, the uppermost one of which being denoted 28, extend from an opposite side of the rotary actuator 24, As the disks 14, 16 may be two sided, each of the actuator arms include either one or two head gimbal assemblies associated with the adjacent sides of the disks 14, 16. Each head gimbal assembly includes an air bearing slider (the uppermost one being denoted 30). Each air bearing slider 30 is contemplated to include a transducer head 32 (as shown in phantom in FIG. 5) for reading and writing data from and to the disk 14. Each of the head gimbal assemblies includes a suspension 34. The air bearing slider 30 is attached to the suspension 34 via a gimbal (not shown).

The air bearing slider 30 is configured to fly above a disk surface 36 of the disk 14 for reading and/or writing data from and to the disk 14. In this regard, during operation of the disk drive 10, in order to maintain the position of the slider 30 adjacent the disk 14, the suspension 34 is configured to exert a force against the attached slider 30 towards the disk 14. Aerodynamic characteristics of the slider 30 result in air pressures which provide the slider 30 with the necessary aerodynamic lift required to fly the slider 30 at a prescribed operational fly height above the disk surface 36 of the disk 14.

In the embodiment shown, the disk drive 10 includes a slider loading/unloading ramp 38 positioned adjacent an OD of the disk 14 for parking the air bearing slider 30. It contemplated that in another embodiment, the slider loading/unloading ramp 38 may be located in an alternate position such as adjacent an ID of the disk 14.

An aspect of the present invention can be regarded as a method of operating the disk drive 10. The disk drive 10 includes the disk 14 having the disk surface 36, the slider 30 disposable adjacent the disk surface 36 for writing and reading data to and from the disk 14, and a slider loading/unloading ramp 38 for the slider 30. The method includes rotating the disk 14 at a loading speed. The method further includes loading the slider 30 from the loading/unloading ramp 38 at a loading fly height above the disk surface 36. The method further includes rotating the disk 14 at an operational speed greater than the loading speed. The method further includes operating the slider 30 at an operational fly height above the disk surface 36 less than the loading fly height above the disk surface 36. The method further includes rotating the disk 14 at an unloading speed less than the operational speed. The method further includes unloading the slider 30 from the disk 14 to the loading/unloading ramp 38 at an unloading fly height greater than the operational fly height.

Figure 3:
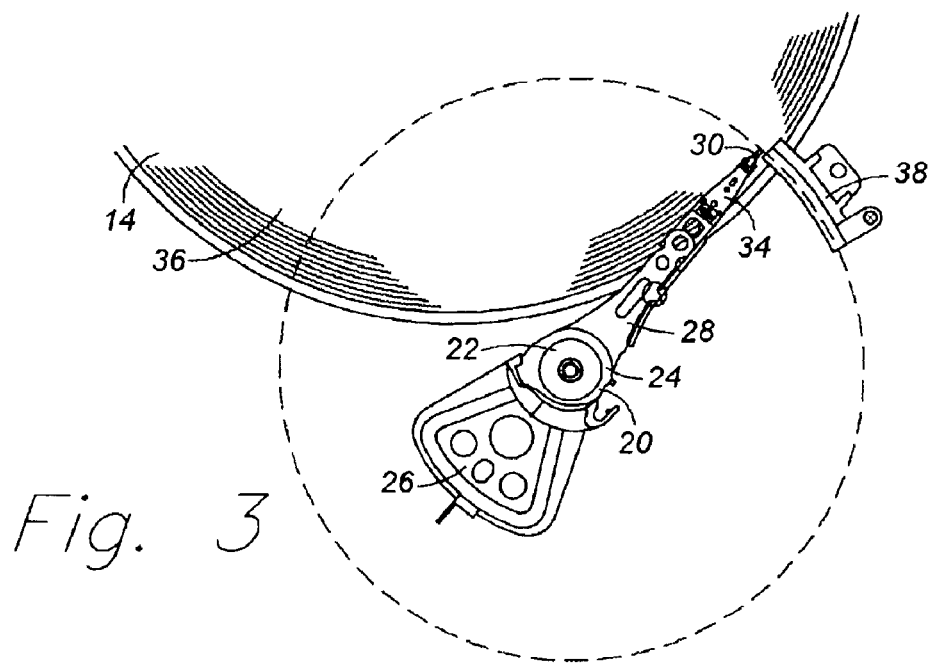
FIG. 3 is a top view similar to FIG. 2, however, with the head stack assembly with the sliders in a loading/unloading position.
Figure 4:
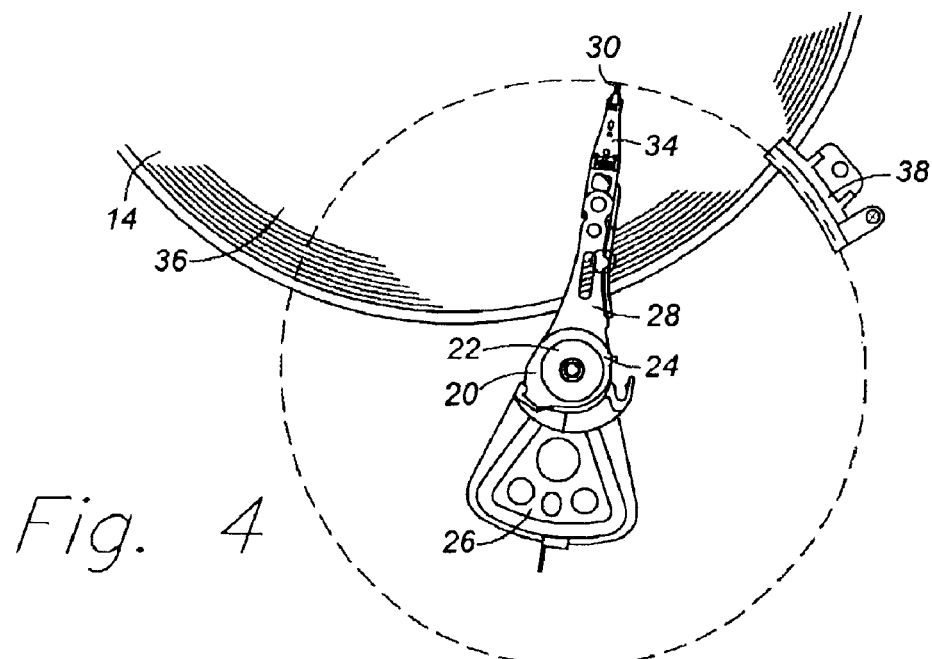
FIG. 4 is a top view similar to FIG. 2, however, with the head stack assembly with the sliders in an exemplary operational position.

In further detail, as mentioned above in relation to FIG. 2, the slider 30 is shown in a parked position with respect to the slider loading/unloading ramp 38. Upon initiation of the method of the present invention, the disk 14 is spun up to rotate at the loading speed. The rotary actuator 24 is pivoted so as to move the slider 30 towards the disk 14. As the rotary actuator 24 continues to pivot the slider 30 along the slider loading/unloading ramp 38 the slider 30 becomes influenced by an air flow resulting from the rotation of the disk 14. Referring now to FIG. 3, the slider 30 is shown in a loading position. In this regard, the air bearing slider 30 is fully aerodynamically supported and is no longer supported by the slider loading/unloading ramp 38. In this position, the slider 30 is at the loading fly height. Referring now to FIG. 4, the slider 30 is shown in an exemplary operational position with respect to the disk 14. In this regard, the speed of the disk 14 is increased from that of the loading speed to the operational speed. The slider 30 is particularly designed so as to fly at a lower fly height at the operational fly height than the loading fly height. The process is reversed upon conclusion of performing desired disk reading or writing operations with the pivoting of the rotary actuator 24 so as to move the slider 30 back towards the slider loading/unloading ramp 38. The rotation of the disk 14 is reduced to the unloading speed and the slider 30 is unloaded at the unloading fly height that is greater than the operational fly height.

As such, while performing both loading and unloading operations, the slider 30 is a greater distance away from the disk surface 36 in comparison to disk drive operating conditions. By operating the disk drive 10 in this manner, there is provided a higher degree of margin to mitigate against undesirable contact between the slider 30 and the disk surface 36 during loading and unloading operations. This is in comparison to the prior art method of operating a slider at loading and unloading fly heights equal to the specified operational fly height. Moreover, while performing both loading and unloading operations, the disk 14 is rotated at loading and unloading speeds that are less than the operational speed. This reduces the relative strength of any potential impact between the slider 30 and the disk surface 36 during slider loading and unloading operations. Further, the relatively lower unloading speed results in a lower unloading breakaway force.

According to various embodiments, the loading speed may be between 10% to 90% of the operational speed. The unloading speed may be between 10% to 90% of the operational speed. The loading speed may be substantially equal to the unloading speed. The loading fly height may be between 5% to 50% of the operational fly height above the operational fly height. The unloading fly height may be between 5% to 50% of the operational fly height above the operational fly height. The loading fly height may be substantially equal to the unloading fly height.

Figure 5:
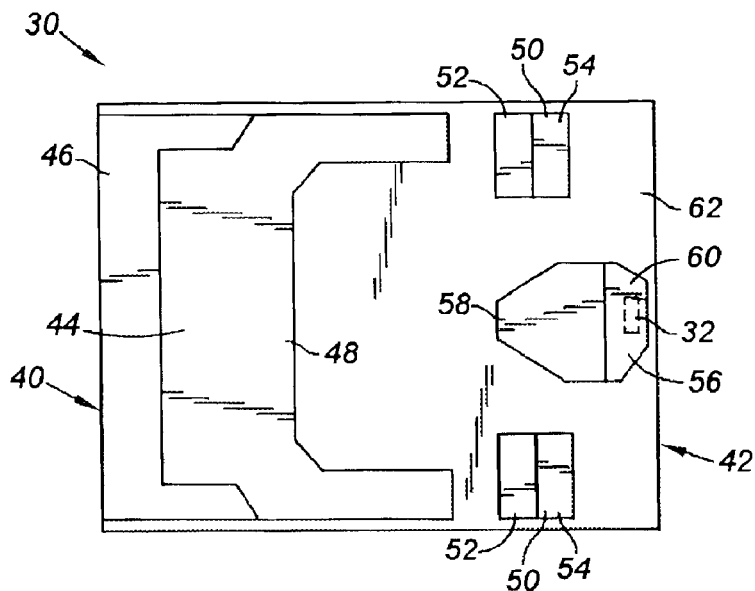
FIG. 5 is a bottom view of a slider as may be utilized in the method in accordance with the present invention.

Referring now to FIG. 5 there is depicted an enlarged plan view of the air bearing surfaces of the slider 30. This particular configuration is shown as an example of a suitable slider design for achieving the desired flight profile required by the method of the present invention. In this regard, it is understood that other geometries and configurations may be utilized. In the embodiment shown, the air bearing slider 30 is provided with a leading side 40 and an opposing trailing side 42. The slider 30 further includes a leading side air bearing surface 44. The leading side air bearing surface 44 includes a leading portion 46 and a trailing portion 48. Side pads 50 are provided having leading and trailing portions 52, 54. A center pad 56 is provided having a leading portion 58 and trailing portion 60. A transducer head 32 (shown in phantom) is disposed within the trailing portion 60 of the center pad 56. The leading side air bearing surface 44, the side pads 50 and the center pad 56 extend from a deep etched surface 62. The leading portions 46, 52, 58 are about 0.127 micro-inches above the deep etched surface 62 and the trailing portions 48, 54, 60 are about 2.032 micro-inches above the deep etched surface 62.

Figure 6:
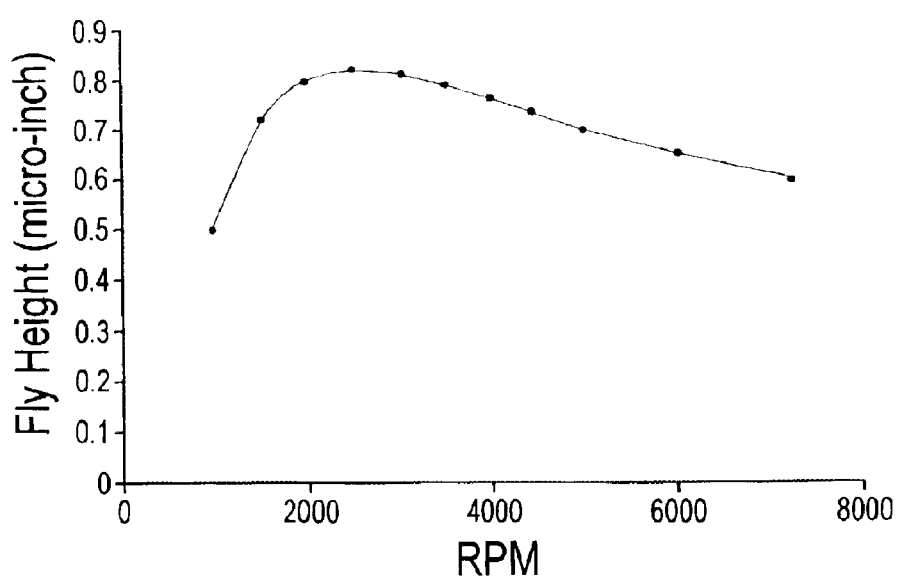
FIG. 6 is a plot of data generated utilizing a slider design similar to that of FIG. 5 of slider fly height with respect to rotational disk speed.

Referring now to FIG. 6, there is depicted a plot of data generated utilizing a slider design similar to that of FIG. 5 of slider fly height with respect to rotational disk speed. In this regard, the disk drive 10 may be operated to have an operational disk speed of 7200 rpm at an operational fly height of about 0.6 micro-inches. As can be seen, reduction of speed from the 7200 rpm point results in higher fly heights until about 2200 rpm. In this example, the loading and unloading speeds may be chosen to be between 2200 rpm and 7200 rpm so as to result in higher fly heights for the loading and unloading fly heights.

We claim:

1. A method of operating a disk drive, the disk drive including a disk having a disk surface, a slider disposable adjacent the disk surface for writing and reading data to and from the disk, and a slider loading/unloading ramp for the slider, the method comprising:
    a) rotating the disk at a loading speed;
    b) moving the slider from the slider loading/unloading ramp to fly at a loading fly height above the disk surface;
    c) rotating the disk at an operational speed greater than the loading speed;
    d) operating the slider at an operational fly height above the disk surface less than the loading fly height above the disk surface;
    e) rotating the disk at an unloading speed less than the operational speed; and
    f) moving the slider from the disk to the slider loading/unloading ramp at an unloading fly height greater than the operational fly height.

2. The method of claim 1 wherein the loading speed is between 10% to 90% of the operational speed.

3. The method of claim 1 wherein the unloading speed is between 10% to 90% of the operational speed.

4. The method of claim 1 wherein the loading speed is substantially equal to the unloading speed.

5. The method of claim 1 wherein the loading fly height is between 5% to 50% of the operational fly height above the operational fly height.

6. The method of claim 1 wherein the unloading fly height is between 5% to 50% of the operational fly height above the operational fly height.

7. The method of claim 1 wherein the loading fly height is substantially equal to the unloading fly height.

8. A method of operating a disk drive. the disk drive including a disk having a disk surface, a slider disposable adjacent the disk surface for writing and reading data to and from the disk, and a slider loading/unloading ramp for the slider, the method comprising:
 a) rotating the disk at a loading speed;
 b) loading the slider from the slider loading/unloading ramp at a loading fly height above the disk surface;
 c) rotating the disk at an operational speed greater than the loading speed;
 d) operating the slider at an operational fly height above the disk surface less than the loading fly height above the disk surface;
 e) rotating the disk at an unloading speed less than the operational speed, the loading speed being substantially equal to the unloading speed; and
 f) unloading the slider from the disk to the slider loading/unloading ramp at an unloading fly height greater than the operational fly height.

9. The method of claim 8 wherein the loading speed is between 10% to 90% of the operational speed.

10. The method of claim 8 wherein the unloading speed is between 10% to 90% of the operational speed.

11. The method of claim 8 wherein the loading fly height is between 5% to 50% of the operational fly height above the operational fly height.

12. The method of Claim 8 wherein the unloading fly height is between 5% to 50% of the operational fly height above the operational fly height.

13. The method of claim 8 wherein the loading fly height is substantially equal to the unloading fly height.

* * * * *